United States Patent [19]

King

[11] 4,057,082

[45] Nov. 8, 1977

[54] PIPELINES

[75] Inventor: Robert Paul King, Bagshot, England

[73] Assignee: The British Petroleum Company Limited, Middlesex, England

[21] Appl. No.: 692,232

[22] Filed: June 2, 1976

[30] Foreign Application Priority Data

June 5, 1975 United Kingdom ............... 24260/75

[51] Int. Cl.² ...................... F16L 55/16; A44B 21/00; B65D 63/00; F16J 15/12
[52] U.S. Cl. ................................. 138/99; 24/263 D; 24/278; 277/188 R
[58] Field of Search .................... 138/99; 285/420, 15; 24/278, 268, 263 D, 263 DJ, 263 DB; 277/188 R, 128

[56] References Cited

U.S. PATENT DOCUMENTS

| 631,179 | 8/1899 | Rucker | 138/99 |
|---|---|---|---|
| 2,199,552 | 5/1940 | Watson | 138/99 |
| 2,616,736 | 11/1952 | Smith | 138/99 |
| 2,850,045 | 9/1958 | Soehnlen et al. | 138/99 |
| 3,586,057 | 6/1971 | Lambert | 138/99 |

Primary Examiner—Steven L. Stephan
Attorney, Agent, or Firm—Morgan, Finnegan, Pine, Foley & Lee

[57] ABSTRACT

A leak repair apparatus for use on an underwater pipeline has a compressible sealing element and a clamp which by means of screws and chains (passing around the pipeline) applies pressure to the sealing element to seal the leak.

2 Claims, 7 Drawing Figures

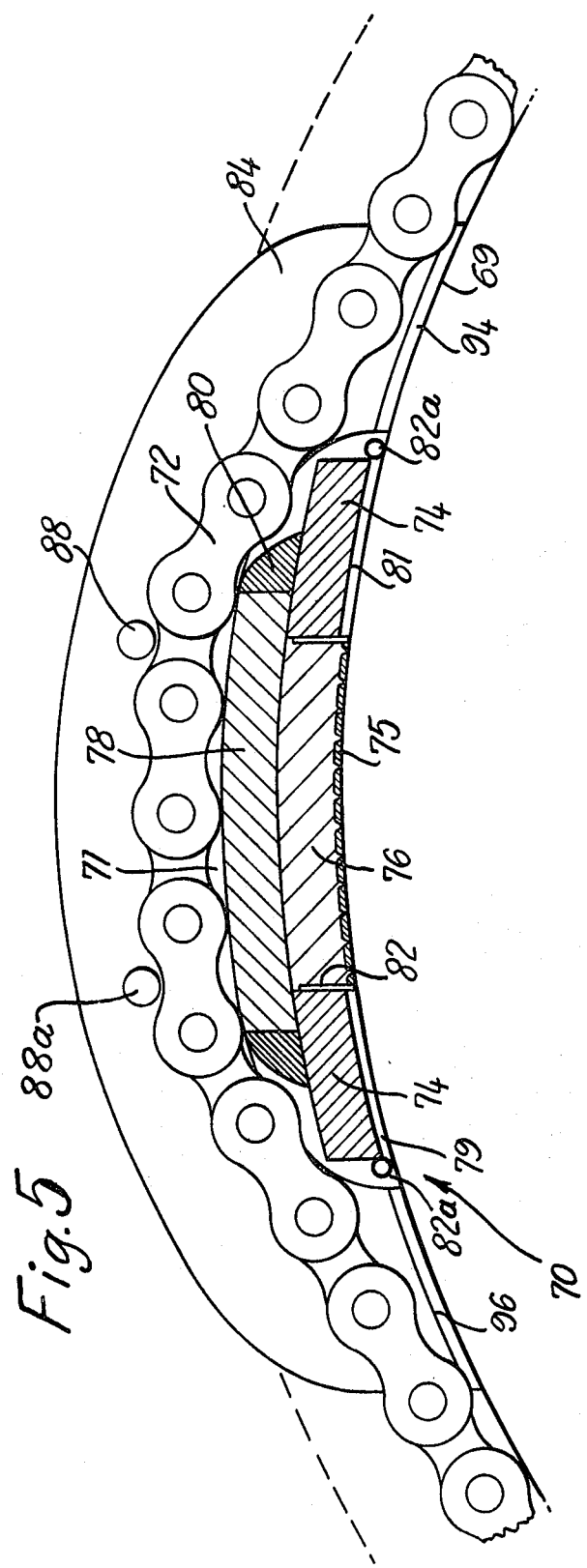

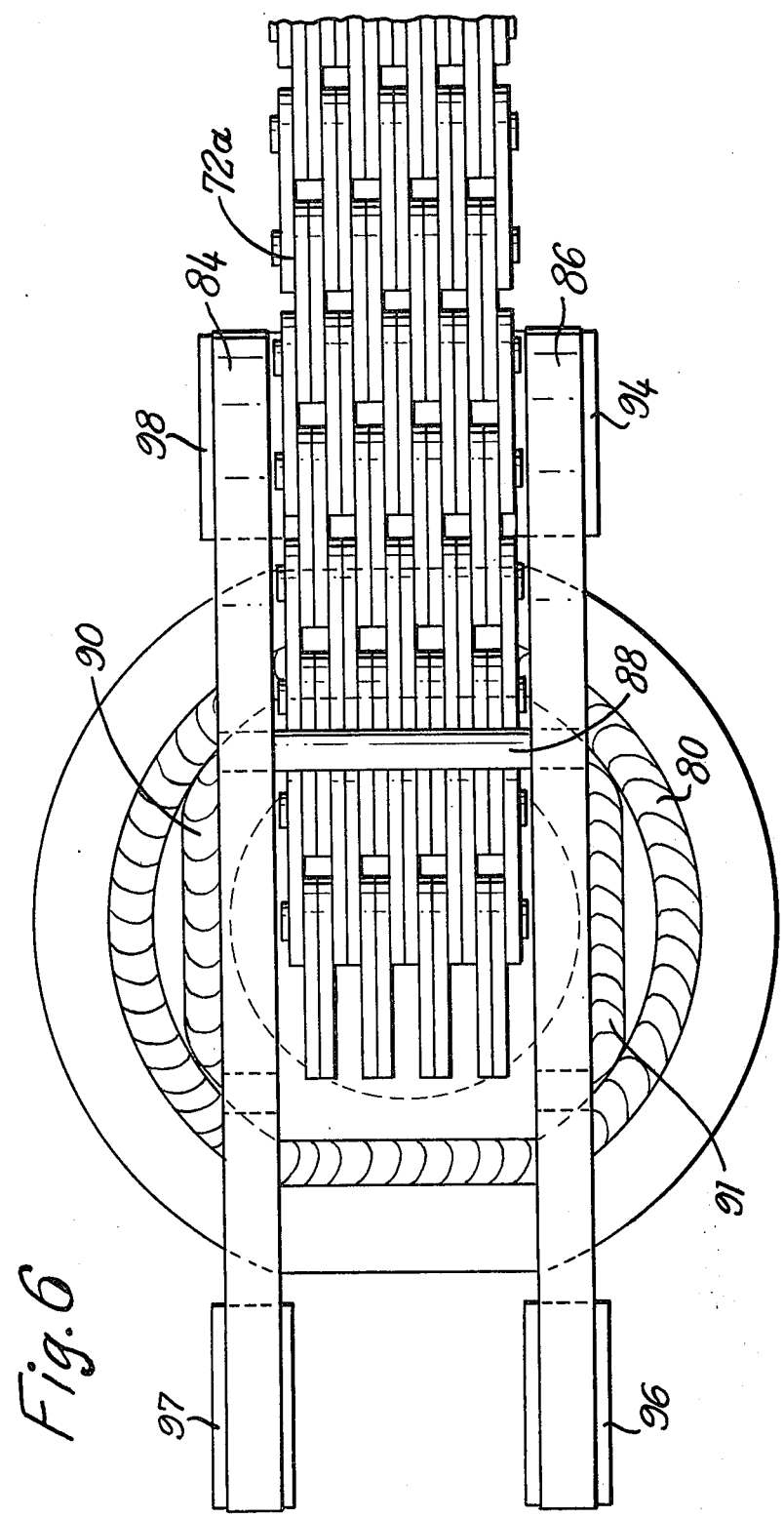

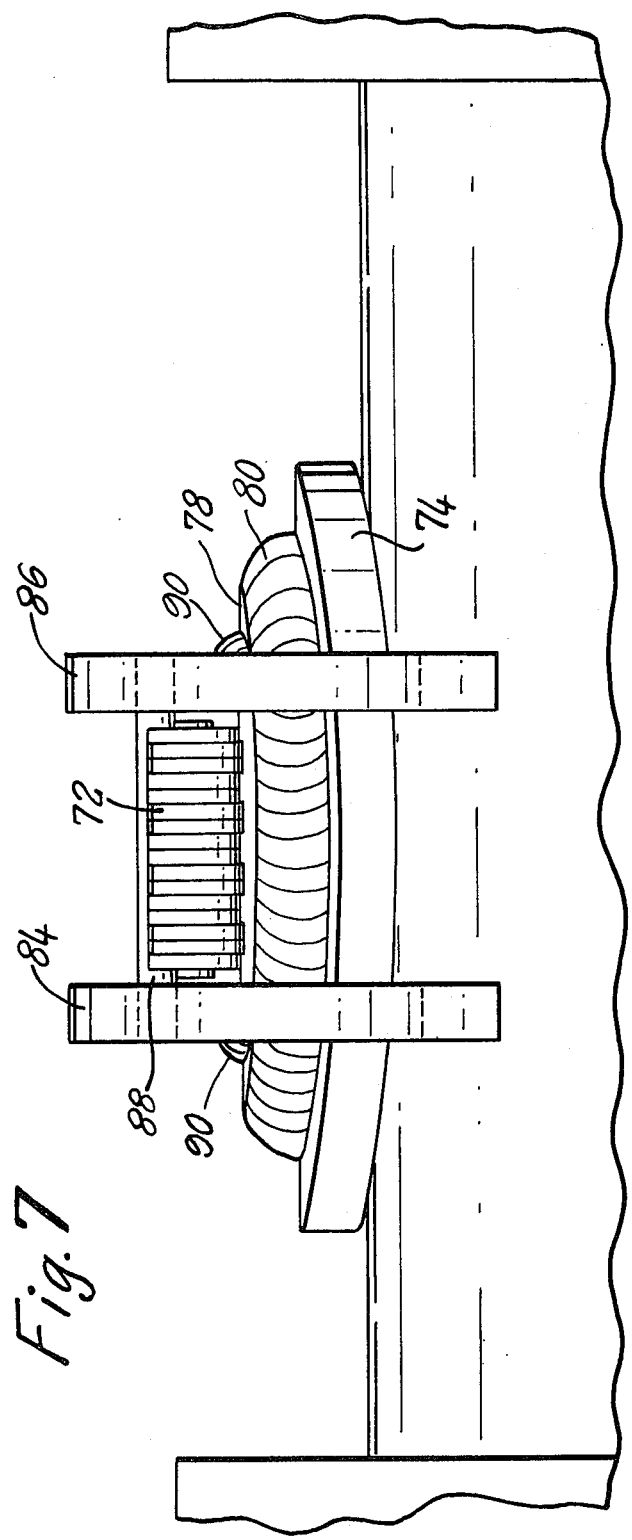

PIPELINES

This invention relates to an apparatus and a method for the repair of damaged pipelines, more particularly pipelines that have developed holes.

Occasionally a pipeline may develop a hole e.g. a slit or crack. This may happen during pipeline laying operations or when the pipeline is in use. Once a hole has been formed, product e.g. crude oil, gas or chemicals will be lost from the pipeline and the economic and environmental consequences can be very serious.

According to the present invention an apparatus for the repair of a pipeline or the like having a hole in the wall thereof comprises a compressible sealing element and a clamping means for compressing the compressible sealing element against the outer surface of the wall of the pipeline or the like.

The clamping means can comprise a holder for holding the sealing element against the outer surface of the wall of the pipeline and means for applying pressure to the holder radially inwardly with respect to the pipeline to compress the sealing element.

The means for applying pressure to the holder can be hydraulic or mechanical and can comprise an elongate flexible member to be placed around the pipeline and capable of being tensioned and means for applying tension to the elongate flexible member.

The means for applying tension to the elongate flexible member can comprise a plurality of bolts or screws referred to hereafter as screws arranged so that on tightening the screws the ends thereof contact the pipeline or other immoveable member.

Preferably the holder is adapted to be welded to the pipeline or the like.

Preferably the holder has a concave surface to contact the surface of the pipeline or the like.

Preferably the holder has means to prevent extrusion of the compressible sealing element, e.g. a ring of rods disposed so that their axes are lying mutually parallel and their inner ends contact the pipeline surface around the sealing element within the holder. Preferably the rods each have independent contact with a portion of the sealing element and freedom to move relative to one another and to the holder such that the rods are always in contact with the pipeline.

Preferably means are provided to retain the rods perpendicular to a given axis e.g. by locating one of the rods within a groove formed in an inner surface of the holder or other member.

The holder can have a moveable member for pressing the sealing element against the outer surface of the wall of the pipeline and means for applying pressure to the moveable member radially inwardly with respect to the pipeline to compress the sealing element against the surface thereof.

The means for applying pressure to the holder can comprise a plurality of screws which engage the holder for the moveable member so that on turning the screws the ends thereof contact the moveable member and cause same to move inwardly and radially with respect to the pipeline and means for maintaining the holder on the pipeline against the reaction of the applied pressure.

Conveniently the moveable member is in the form of a block which preferably has a concave curved surface for compressing the sealing element against the outer surface of the wall of the pipeline. In use the block will preferably be chosen so that the radius of curvature of the curved surface is substantially the same as that of the outer wall of the pipeline. As an alternative to, or as well as, the block having a curved surface, the sealing element itself can have a curved surface in its uncompressed state for contacting the outer surface of the wall of the pipeline, and preferably the curved surface is of substantially the same radius as the pipeline or the like.

The means for maintaining the holder on the pipeline against the reaction of the applied pressure can comprise an elongate flexible member to be placed around the pipeline and capable of being tensioned. Preferably the elongate flexible member is a chain e.g. of the leaf type, and one or more means for removing the initial slackness are provided, said means having curved claws to be inserted through the apertures in the chain to contact the pipeline and lift the chain off the pipeline surface and thereby take up slack in the chain.

Preferably the apparatus has means for applying tension to the elongate flexible member.

The sealing element can be in the form of a disc plate or an O ring or preferably a relatively thick moulding chosen so that its diameter is at least equal to the greatest dimension of the hole. Preferably the surface of the sealing element which is to contact the pipeline has a plurality of intersecting ridges adapted to contact the surface of the pipeline. Preferably the ridges define a plurality of discrete areas and are each capable of sealing against the pipeline surface independently. Conveniently the ridges can be in a regular arrangement e.g. defining a plurality of squares so that the surface of the element is waffle-like. The sealing element can comprise a plurality of O-ring having different diameters and arranged concentrically so that they are all in the same plane.

The sealing element can be made of polytetrafluoroethylene, polychloroprene, nitrile rubber (which has the advantage of being oil resistant) or "Viton" a Registered Trade Mark relating to copolymers of vinylidene fluoride and hexafluoropropylene and sold by Du Pont.

Conveniently the jacking screws can be mounted in a pad which is to be between the holder and the cable or chain and arranged so that on tightening the screws their ends engage the holder, and the pad is caused to move outwardly and radially with respect to the pipeline and thereby apply tension to the cable or chain.

Preferably the apparatus has two pads each pad being held in a groove in the outer surface of the holder at opposite ends of the holder.

Preferably the holder has a recess therein to accommodate a small amount of radial movement of the moveable member with respect to the pipeline to prevent damage to the sealing element during positioning of the apparatus on the pipeline over the hole. The holder can also have releaseable means for holding the moveable member and sealing element out of contact with the pipeline e.g. a circumferential O-ring on the moveable member engaging the inside of the holder.

Preferably the clamping means for compressing the sealing element against the pipeline has a further number of screws engaging holes in the upper part of the holder and arranged so that on tightening, their ends engage the moveable member and cause the latter to move relative to the holder and inwardly and radially with respect of the pipeline.

Preferably the holder and moveable member have means to prevent rotation of the latter on tightening the screws e.g. an eccentrically mounted dowel pin.

According to another aspect of the invention a method for repairing a pipeline having a hole in the wall thereof comprises:
  i. placing a compressible sealing element over the hole, the element being of sufficient size to make contact with the wall of the pipeline or the like around the entire hole,
  ii. holding a clamping member over the sealing element and operating the clamping member to compress the sealing element against the outer wall of the pipeline or the like to thereby seal the hole.

Preferably the holder for the sealing element is weldable to the pipeline or the like and preferably welding is effected.

The method can be employed when the pipeline is underwater. When the pipeline has a weight coating it will be necessary to remove the coating in the locality of the hole, preferably around the circumference of the pipeline prior to carrying out the repair.

If the hole is at a field joint which is usually covered with a bitumen-containing composition it will be necessary to remove the composition in the locality of the hole to permit the sealing element to contact the wall of the pipeline.

The method can be employed to repair any shape of hole. The method is particularly suitable for repairing holes whose greatest dimension is not greater than 4 inches and also for holes where on dimension is at least 10 times the dimension at right angles thereto: such holes are referred to as slits. The method can be employed regardless of whether the longer dimension of the slit is parallel to the axis of the pipeline or at an angle thereto.

When the hole is of a more regular shape than a slit, the diameter of the smallest and innermost O-ring will be chosen so that a substantial portion of the O-ring is supported by the outer surface of the wall of the pipeline.

Preferably the jacking screws and the further screws engaging holes in the upper part of the block are tightened to a torque of at least 50 lb ft, preferably 100 to 250 lb ft. Preferably both sets of screws are tightened to about the same torque.

The invention is illustrated by the accompanying drawings in which

FIG. 5 is a vertical section showing an alternative embodiment of the invention on a pipeline.

FIG. 6 is a plan view of the embodiment shown in FIG. 5.

FIG. 7 is an elevation of the embodiment shown in FIG. 5.

Figure 1:
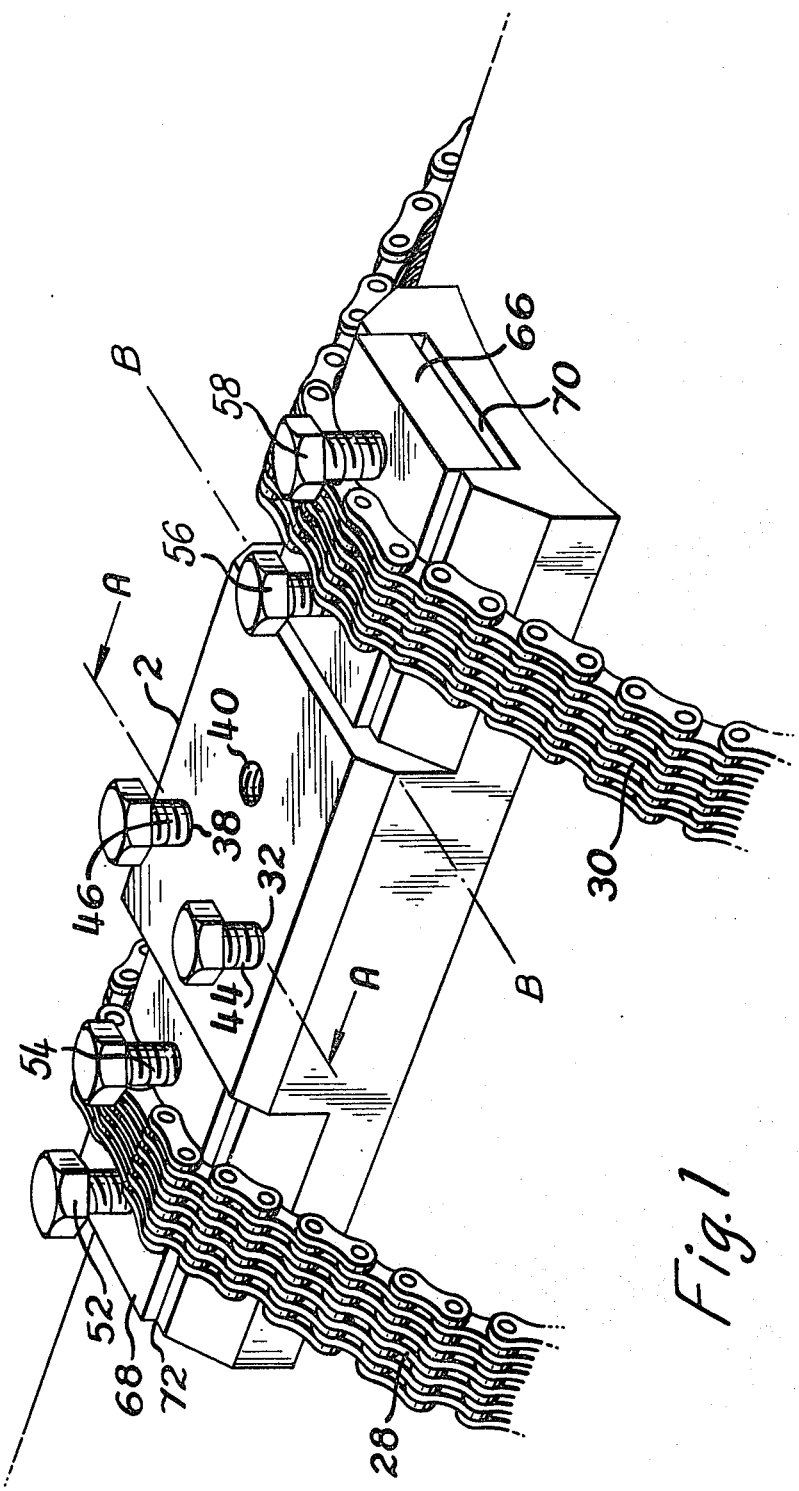
FIG. 1 is a perspective view of the apparatus installed on a pipeline.
Figure 2:
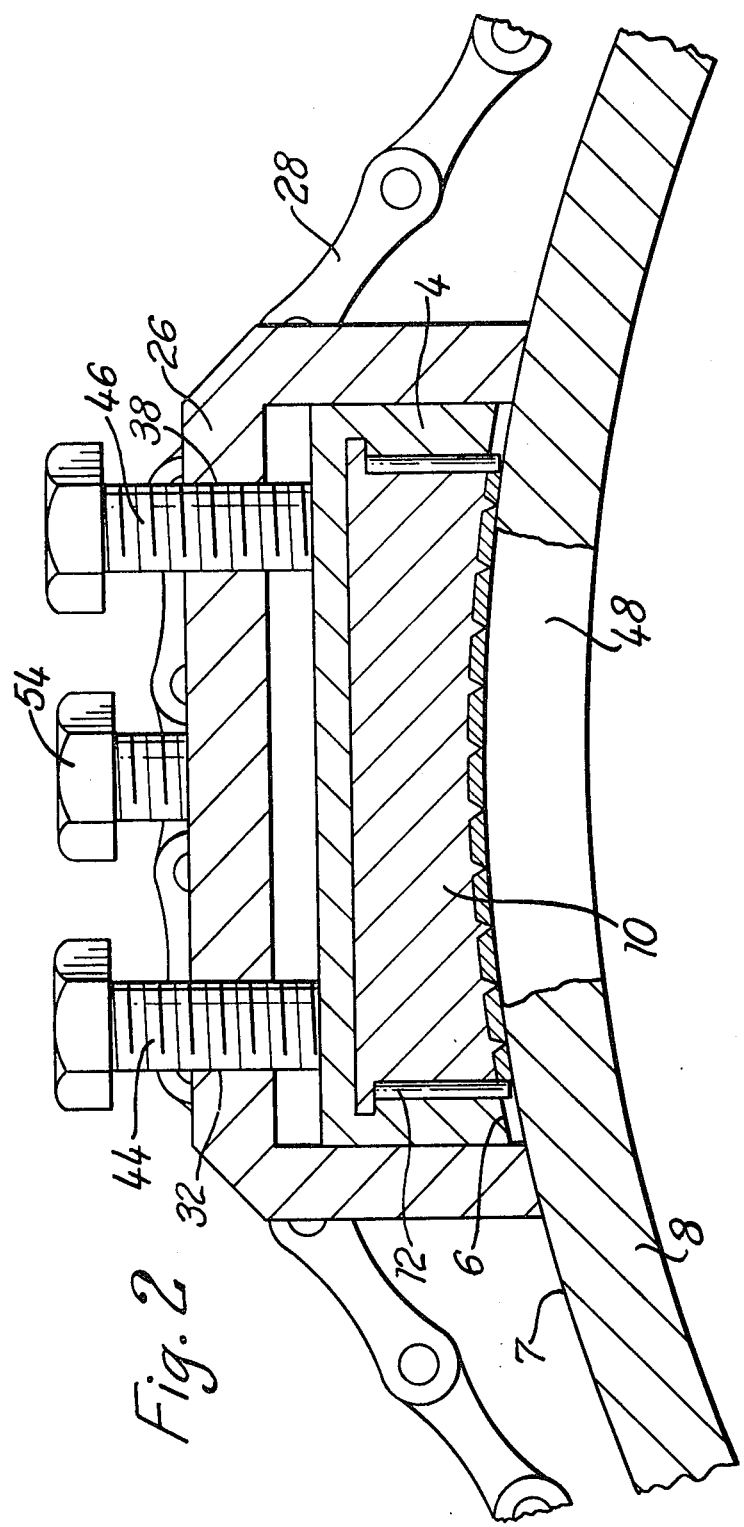
FIG. 2 is a cross section taken along the line A—A of FIG. 1.
Figure 3:
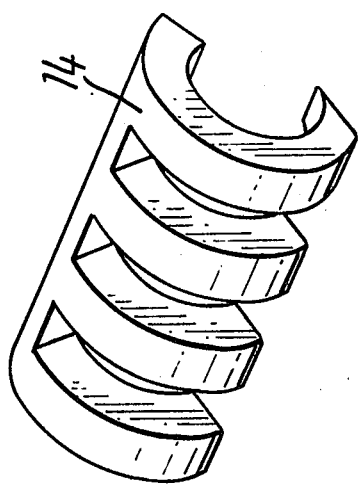
FIG. 3 is a perspective view of an element for removing slackness in the chains.

In both FIGS. 6 and 7 part of the chain has been cut away.

The apparatus is indicated generally by reference numeral 2. The apparatus has clamping means comprising a moveable member in the form of a steel block 4, held in a holder 26 and engaged by three screws in holes 32, 38 and 40, only two of the screws 44 and 46 being shown, and a compressible sealing element in the form of a moulding of polychloroprene rubber 10. Disposed around the moulding 10 and within the block 4 is a ring of rigid rods 12 to prevent extrusion of the moulding. The steel block 4 has a curved surface 6 which is of substantially the same radius of curvature as that of the outer surface of the wall 7 of the pipeline 8.

The holder 26 is held in place on the pipeline 8 by leaf type chains 28 and 30 which pass circumferentially round the pipeline 8 and over pads 66 and 68 (which lie in grooves 70 and 72 in the holder 26). In each of the pads 68 and 66 are two jacking screws 52 and 54, and 56 and 58 respectively for applying tension to the chains.

In use the holder 26, block 4, sealing element 10 and anti-extrusion pins 12 and pads 66 and 68 are assembled and placed on the pipeline 8 having previously removed any coating such as concrete or bitumen, if present, and reduced the pressure in the pipeline to ambient. Chains 28 and 30 are then installed on the pipeline 8 and joined by pins (not shown) and then placed over the frame 26. With some slack in the chains the apparatus is positioned so that the sealing element 10 is symmetrically located over the hole, which in this example is a slit 48 of three inches in length the longer dimension of the slit lying circumferentially.

Figure 4:
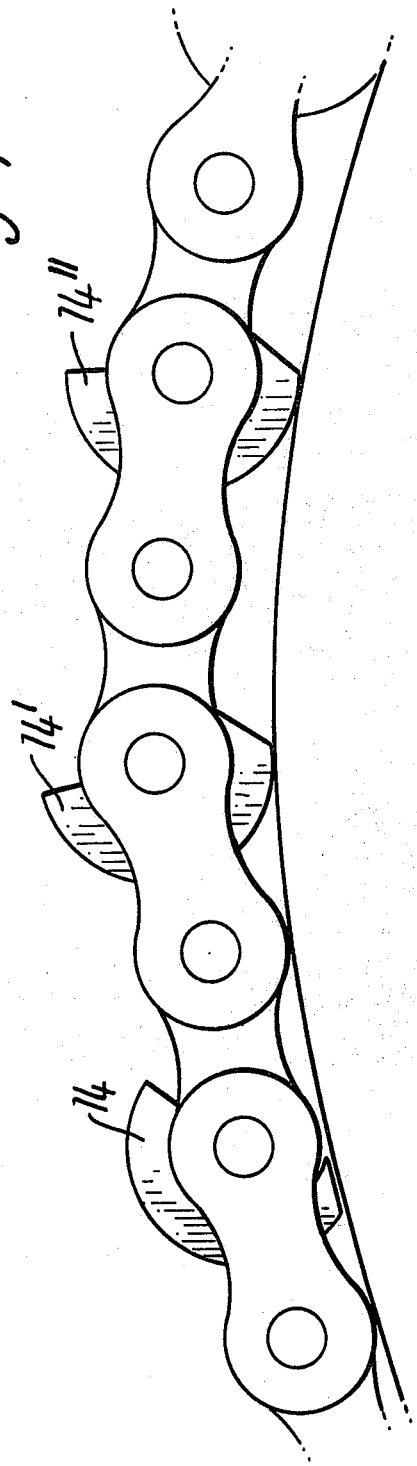
FIG. 4 is an elevation showing three elements two of which have been rotated to take up slackness in the chain.

The initial slackness in the chains is removed by inserting a number of tensioning elements 14 having curved claws to take up slack in the chains as shown in FIG. 4. In FIG. 4 elements 14' and 14" have been rotated to take up slack, element 14 has not.

Screws 52 and 54, and 56 and 58 are then tightened to 150 lb ft using a torque wrench. The three screws in the holder two of which 44 and 46 are shown are then also tightened to 150 lb ft.

The pipeline can then be pressure tested with water in known manner at 3000 lbs/sq.in. and found not to leak.

With reference to FIGS. 5 to 7 the apparatus indicated generally by reference numeral 70 comprises a holder indicated generally by 71 and a sealing element in the form of a compressible polychloroprene moulding 76 having in its uncompressed state a curved face 75 having a waffle-like surface formed by ridges defining discrete areas, the ridges being capable of sealing against the pipeline 69. In the uncompressed state the moulding 76 is proud of the curved surface 81 of the holder 71 so that on applying the compression the surface 81 will move to contact the pipeline 69 to permit welding at zone 82a. The holder 71 comprises two pieces of pipeline 74 and 78 similar to the pipeline 69 joined together at weld 80.

The apparatus has two reinforcing members or strongbacks 84 and 86 welded to the holder 71 at welds 90 and 91 and two pins 88 and 88a to locate the chain 71a.

The apparatus has a ring of rods 82 to prevent extrusion of of the sealing element 76. A chain 72a of the leaf type (which is tensioned by means of a block, pad and screws (not shown) but similar to that portion of FIG. 1 on the right of the vertical plane through the line B—B, is used to keep the holder on the pipeline 69. The apparatus is used in a manner similar to that previously described with reference to FIGS. 1 to 4 i.e. the chain 72a is tensioned to compress the element 76 and move curved surface 81 of the holder into contact with the surface of the pipeline 69. At this stage the pipeline is then repaired, at least temporarily. A more permanent repair is effected by welding the holder 71 at zone 82a to the pipeline, and the strongbacks 84 and 86 to the pipeline 69 at zones 94, 96, 97 and 98.

I claim:

1. An apparatus for the repair of a pipeline having a hole in the wall thereof and suitable for withstanding an internal pipeline pressure of up to 3000 psi comprising:
   a. a compressible sealing element;
   b. a holder for holding the sealing element against the outer surface of the wall of the pipeline;
   c. means for applying pressure to the sealing element radially inwardly with respect to the pipeline to compress the sealing element against the surface thereof around the hole and for maintaining the holder on the pipeline against the reaction of the applied pressure comprising an elongate flexible member to be placed around the pipeline and holder and capable of being tensioned and means for applying tension to the elongate flexible member; and
   d. means to prevent extrusion of the sealing element comprising a ring of rods disposed so that their axes are lying mutually parallel and their inner ends contact the pipeline surface around the sealing element within the holder.

2. An apparatus as claimed in claim 1 wherein the means for applying pressure to the sealing element comprises a member movable relative to the holder in a direction radial with respect to the pipeline for pressing the sealing element against the outer surface of the wall of the pipeline and screw means for moving said movable member.

* * * * *

UNITED STATES PATENT AND TRADEMARK OFFICE
CERTIFICATE OF CORRECTION

PATENT NO. : 4,057,082
DATED : November 8, 1977
INVENTOR(S) : Robert Paul King

It is certified that error appears in the above-identified patent and that said Letters Patent are hereby corrected as shown below:

Column 4, line 53, change "71a" to --72a--.

Signed and Sealed this

Twenty-first Day of February 1978

[SEAL]

Attest:

RUTH C. MASON
*Attesting Officer*

LUTRELLE F. PARKER
*Acting Commissioner of Patents and Trademarks*